United States Patent [19]

Sugimoto

[11] Patent Number: 4,932,312
[45] Date of Patent: Jun. 12, 1990

[54] MASTER CYLINDER PISTON VALVE

[75] Inventor: Riichirou Sugimoto, Higashimatsuyama, Japan

[73] Assignee: Jidosha Kiki Co., Ltd., Tokyo, Japan

[21] Appl. No.: 200,069

[22] Filed: May 27, 1988

[30] Foreign Application Priority Data

Jun. 5, 1987 [JP] Japan .................. 62-87171
Jun. 5, 1987 [JP] Japan .................. 62-87170

[51] Int. Cl.⁵ .......................... F01B 31/00
[52] U.S. Cl. ...................... 92/135; 60/562;
60/588; 92/130 R; 137/508; 137/543.23; 251/337
[58] Field of Search ............ 137/543.23, 508;
251/337; 60/585-589, 594, 562, 574; 92/130 R, 131, 135

[56] References Cited

U.S. PATENT DOCUMENTS

| | | | |
|---|---|---|---|
| 1,218,730 | 3/1917 | Wettrich et al. | 251/337 |
| 1,775,069 | 9/1930 | Finney | 251/337 |
| 1,862,283 | 6/1932 | Schoetzow | 251/337 |
| 2,033,512 | 3/1936 | Carliss | 137/543.23 |
| 2,507,384 | 5/1950 | Schneck | 137/508 X |
| 2,950,600 | 8/1960 | Huck | 137/543 X |
| 3,051,196 | 8/1962 | Miller | 137/543.23 |
| 3,612,016 | 10/1971 | Jelen | 251/337 X |
| 4,492,082 | 1/1985 | Belart | 60/589 |
| 4,707,989 | 11/1987 | Nakamura et al. | 60/589 |

FOREIGN PATENT DOCUMENTS

| | | |
|---|---|---|
| 1092737 | 4/1955 | France ............ 137/543.23 |
| 1304097 | 8/1961 | France . |
| 55-30766 | 7/1980 | Japan . |

Primary Examiner—Edward K. Look
Attorney, Agent, or Firm—McGlew & Tuttle

[57] ABSTRACT

A valve for an automotive brake master cylinder piston is disposed at the end of forward stroke of the brake master cylinder piston in a passage defined along the axis of the master cylinder piston and communicating mutually an oil reservoir and an oil outlet, and is adapted to close and open the passage when abutting upon the departing from a side wall surface of the end of forward stoke of the master cylinder piston in accordance with a forward stroke motion and a return stroke motion of the master cylinder piston. The valve comprises an extension rod extending into the opening of the passage, the extension rod being formed with a first restricting at the leading end thereof extending slidably into the opening of the passage, and also formed with a second restricting at the opposite root portion thereof adapted to operatively engage with the inner circumferential edge of one end of the passage through a tapered surface thereof, when the valve is closed, and to guide the valve to be shifted in the axial direction in such a manner that the first and second restricting may have the axis of the valve coincide with the axis of the passage at the time of closing of the valve.

1 Claim, 6 Drawing Sheets

4,932,312

MASTER CYLINDER PISTON VALVE

FIELD OF THE INVENTION AND RELATED ART STATEMENT

The present invention relates to an improvement in a valve for a piston of the so-called center valve type master cylinder for use in an automotive brake system, and more particularly to a valve mechanism in which a valve is, when closed, put in such an axial relationship that the axis thereof may come to coincide with the axis of an oil passage defined in a master cylinder piston.

There is shown, in longitudinal cross-section, a typical conventional hydraulic brake master cylinder design in FIGS. 3 through 5. Referring more specifically to FIG. 3, there is shown by way of an example a master cylinder for an automotive brake system, in which there are shown provided a cylinder body designated at the reference numeral 1, a first piston at 2, a second piston at 3, and an input rod at 4. Also, a pair of oil inlets 5 and 6 are seen provided on the top side of the cylinder body 1 to be connected to an oil reservoir not shown.

On the other hand, a pair of outlets 7 and 8 are seen provided on the opposite bottom side of the cylinder body 1 to be connected to a corresponding pair of brake wheel cylinders not shown, respectively.

The first and second pistons 2 and 3 mounted opposedly with each other are defined with passages 9 and 10 extending in their longitudinal axis, respectively. While these passages 9 and 10 are adapted to normally intercommunicate between the oil reservoir and the outlets 7, 8, it is arranged that when the pistons 2, 3 are caused to be shifted towards a first stroke position (left side as viewed in FIG. 3), the passages 9 and 10 are closed by way of valves 11 and 12 disposed on the left sides of these passages 9, 10, respectively. With this piston position, oil in cylinder chambers 13, 14 defined on the left of the pistons 2, 3 as viewed in FIG. 3 is forced to be discharged from the outlets 7, 8, when the pistons 2, 3 are caused to be shifted towards the first stroke position, thus being directed to each of the brake wheel cylinders to operate the vehicle's brake system.

This is a typical braking operation of the conventional type hydraulic brake master cylinder, and this brake system cannot be relieved of such a drawback inherent to the conventional master cylinder designs. That is a problem of rubber seal damages as encountered in the so-called pumping brake operation on the brake pedal. More specifically, when an operator steps down upon the vehicle's brake pedal repeatedly in the manner of pumping-brake operation, the pistons 2, 3 may firstly be caused to be returned on their rearward or second stroke or towards right as viewed in FIG. 3, and then to be restarted on their forward stroke from the position upon completion of their rearward stroke. At this moment, rubber seal portions 11a, 12a on the valves 11, 12 may possibly be damaged from encroachment into or sticking engagement with the passages 9, 10. This so-called seal sticking may principally occur because of a possible play or loose fitting of the valves 11, 12 in their axial mount, and because of a possible increase in the flow velocity of oil as caused from reduction in a gap with a valve seat as a valve approaches thereto, thereby producing an increased negative pressure in the passages 9, 10 which may possibly force the valve seals to be drawn into the passages. Reviewing further, at the moment that the pistons 2, 3 are caused to move towards their forward stroke positions, it is possible that the flow of oil returning from the cylinder chambers 13, 14 to the oil inlets 5, 6 may have the valves 11, 12 inclined or made eccentric out of their centers, thus making their seal portions 11a, 12a encroach into the openings of the passages 9, 10, and immediately after this as the pistons 2, 3 move having their valves in such attitudes, forcing the valves 11, 12 against valve seats 15, 16, and thus leaving their seal portions 11a, 12a squeezed between the edges of the passages 9, 10 and the valves 11, 12 so as to be damaged physically.

In an attempt to prevent such seal encroachment from occurring, there is a proposal of a countermeasure in the conventional master cylinder arrangement of the automotive braking system, as typically shown in FIG. 3, such that spring retainers 17, 18 covering the valves 11, 12 are provided with guide holes 19, 20, into which there are inserted rods 21, 22 extending slidably from the valves 11, 12 towards the left along the longitudinal axis thereof as viewed in FIG. 3, having in turn the leading ends of the rods 21, 22 guided slidably into a guide hole 23 of the second piston 3 and into a guide hole 25 of a guide member 24, respectively. By the employment of such extensions of the rods 21, 22 from the valves 11, 12 guided into these two guide holes and thus held at two points, the valves 11, 12 may well be held from being inclined or coming off from their axial centers.

In addition to such an arrangement that the valves 11, 12 are held physically at two points as shown in FIG. 3, there are some other proposals as shown in FIGS. 4 and 5. According to the arrangement shown in FIG. 4, it is seen that rods 22 and 26 extend forwardly and rearwardly from the valves 11, 12 along their longitudinal axes, having the leading end of the rod 22 extending forwardly or towards the left as viewed in the Figure held through a guide hole 25 as is the case shown in FIG. 3, while having the rod 26 extending rearwardly or towards the right inserted slidably into the passage 10 of the second piston 3 to be held in position.

The manner that the rod 22 is mounted onto the spring retainer 27 is as shown in FIGS. 4 and 5 such that the rod 22 is firstly introduced into the big opening 28 of the spring retainer 27, and then a thinner portion 22b of the rod may further be inserted into a small opening 29 of the spring retainer 27, accordingly.

OBJECT AND SUMMARY OF THE INVENTION

However, according to such a typical conventional construction of a valve guide arrangement, it was generally disadvantageous in view of an increased number of parts involved from the use of additional guide member, and this would also bring in practice a substantial difficulty to a compact and light design in the master cylinder construction.

In consideration of such drawbacks particular to the conventional construction of a guided type valve for a brake master cylinder structure for use in the automotive vehicle as noted above, it would be desirable to attain an efficient solution for preventing possible inclination of the involved valve members without the use of any additional members, thus overcoming such inevitable problems particular to the conventional construction.

The present invention is essentially directed to the provision of a due and practical solution to such inconveniences and difficulties in practice as referred to above and experienced in the conventional master cylinder piston valve structure of an automotive vehicle which have been left unattended with any proper countermeasures therefor.

It is therefore a primary object of the present invention to provide an improvement in the construction of a master cylinder piston valve structure for use in an automotive vehicle's brake system, whereby there may be attained an efficient effect of overcoming such undesired problems.

Also, it is another object of the invention to provide an improvement in the construction of a master cylinder piston valve structure by making a metal element compact and light, and by facilitating an installation work of involved members, together with the provision of a rigidity of the metal element so as to prevent deformation of a cup seal ring.

The above objects of the invention can be attained as desired from an improvement in a master cylinder piston valve structure for use in an automotive brake system of the type, as summarized in brief, which is disposed at the end of forward stroke of the brake master cylinder piston in a passage means defined along the axis of the master cylinder piston and communicating mutually an oil reservoir and an oil outlet, and adapted to close and open the passage means when abutting upon and departing from a side wall surface of the end of forward stroke of the master cylinder piston in accordance with a forward stroke motion and a return stroke motion of the master cylinder piston; which comprises an extension rod means extending into the opening of the passage means, the extension rod formed with a first restricting means at the leading end thereof extending slidably into the opening of the passage means, and also formed with a second restricting means at the opposite root portion thereof adapted to operatively engage with the inner circumferential edge of one end of the passage means through a tapered surface thereof, when the valve means is closed, and to guide the valve means to be shifted in the axial direction in such a manner that the first and second restricting means may have the axis of the valve means coincide with the axis of the passage means at the time of closing of the valve means.

Also, according to another aspect of the present invention, there is provided an improved master cylinder piston valve which includes, as summarized in brief, a spring receiving element of an annular shape for use in an automotive brake master cylinder piston formed from a sheet metal and disposed in an abutting relationship upon a front wall surface of the master cylinder piston; comprising a plurality of first lug means slitted at the outer circumference of the spring receiving element to be bent extending forwardly of a cup seal ring means, a plurality of second lug means slitted in a like manner with the first lug means to be bent extending forwardly of the master cylinder piston, a remaining circumferential portion excluding the first and second lug means adapted as a first spring receiving portion to receive one end of a return spring means and hold the one end of the return spring means in position by engagement with the second lug means at the outer circumferential portion thereof, and a plurality of third lug means slitted at the inner circumference of the central opening of the spring receiving element to be bent extending into the recess of the master cylinder piston to engage with the inner wall surface of the recess, a remaining inner circumferential portion excluding the third lug means being adapted as a second spring receiving portion to receive one end of a compression spring means.

By virtue of the provision of an improved master cylinder piston valve, which comprises the first restricting section and the second restricting section, the second restricting section serving, when the valve is closed, to fit into the inner circumference of one end of the oil passage defined in the piston through the tapered surface thereof, while the first restricting section serving normally to fit into the oil passage to be guided in a due concentric relationship therewith, whereby the axis of the valve, when closed, is positively held in a concentrically aligned relationship with that of the oil passage by way of two-point mount under the smooth and positive guidance of the first and second restricting sections, an effective solution is afforded to the problem of encroachment on the part of the valve sealing element which was inevitable from a tendency of inclination or eccentricity of the conventional valve construction with no increase of parts required. Also, by virtue of the advantageous arrangement such that the passage area defined between the second restricting section and the inner circumference of the oil passage may decrease gradually prior to the closing of the valving arrangement, there is an effect to restrict the flow velocity of oil around the valve seat section so that the valve seat is kept from a tendency of being deformed and captured between the valve proper and the piston, thus preventing possible damages of the rubber seal from occurring, accordingly.

In addition to the employment of the advantageous arrangement of a master cylinder piston as noted above, there is provided an improved spring retainer member of such a construction that it may fit snugly into a receiving recess of the piston valve, substantially not increasing in the longitudinal dimension of the piston involved, no additional special parts are required for holding the spring retainer member, and furthermore, it may be fitted simply into the piston without any aids of installing, which may undoubtedly contribute to the efficiency of assembly work. With this advantageous arrangement, when the operator operates the vehicle's brake in the manner of so-called pumping braking operation, the spring retainer member may serve to positively keep the cup seal ring on the piston from being deformed under the effect of oil flows passing therethrough, thus affording an excellent effect of preventing possible damages of the cup seal ring on the piston from its encroachment during the braking operation, accordingly.

Additional features and advantages of the invention will now become more apparent to those skilled in the art upon consideration of the following detailed description of a preferred embodiment exemplifying a best mode of carrying out the invention as presently perceived. The detailed description refers particularly to the accompanying drawings, in which like parts are designated at like reference numerals.

DETAILED DESCRIPTION OF PREFERRED EMBODIMENTS

Figure 1:
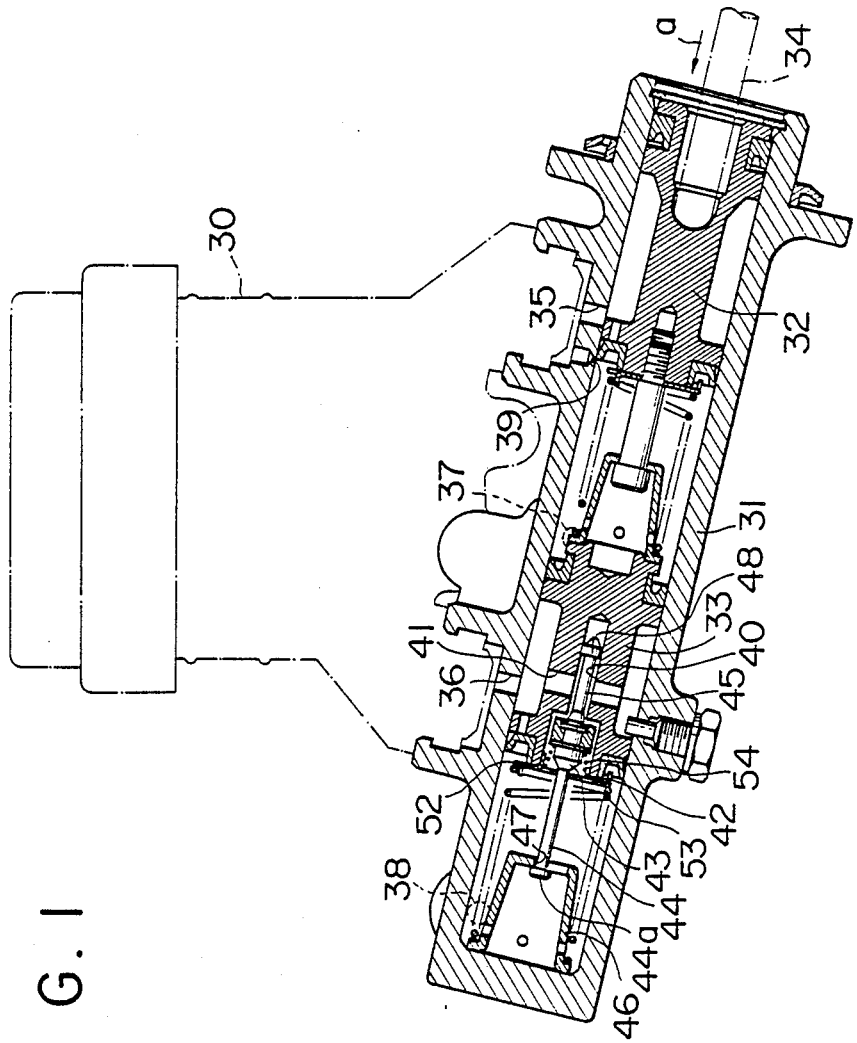
FIG. 1 is a longitudinal cross-sectional view showing by way of a preferred embodiment, the general construction of a hydraulic brake master cylinder for use in an automotive vehicle according to the present invention.

The present invention will now be explained in detail by way of a preferred embodiment thereof in conjunction with accompanying drawings herewith. Referring firstly to FIG. 1, there is shown in a longitudinal cross section an improved valve construction for use in an automotive brake master cylinder according to the invention. In FIG. 1, there are shown provided an oil reservoir designated at the reference numeral 30, a cylinder body at 31, a first piston at 32, a second piston 33, an input rod at 34, oil inlets at 35 and 36, and oil outlets designated at 37 and 38, respectively.

In this master cylinder construction according to the invention, there is a center valve system adopted in the second piston 33, and the first piston 32 is of the type with an oil-port 39. The following description will essentially be directed to the second piston 33 and its related parts.

Figure 2A:
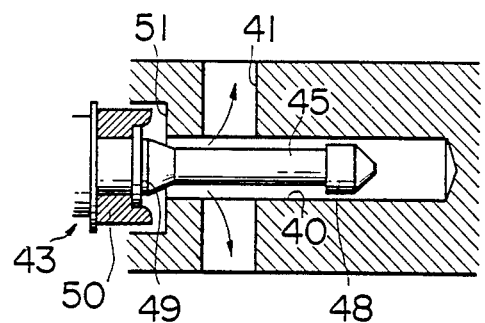
FIGS. 2 (a) and 2 (b) are like enlarged fragmentary views showing, in cross section, the valving elements of a second piston of the master cylinder.
Figure 2B:
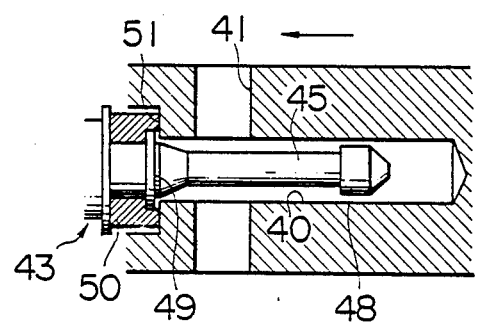
Figure 3:
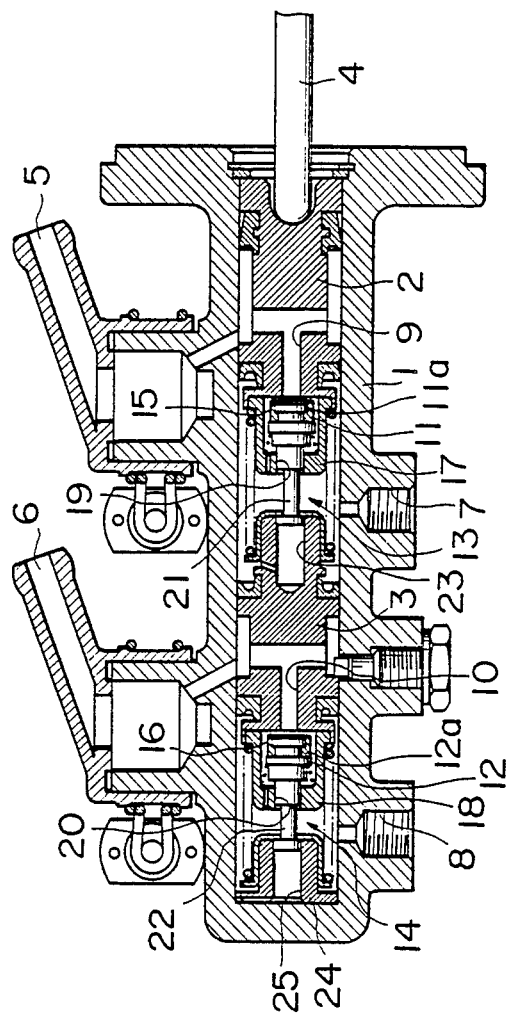
FIG. 3 is a longitudinal cross-section showing the general construction of a typical conventional master cylinder.
Figure 4:
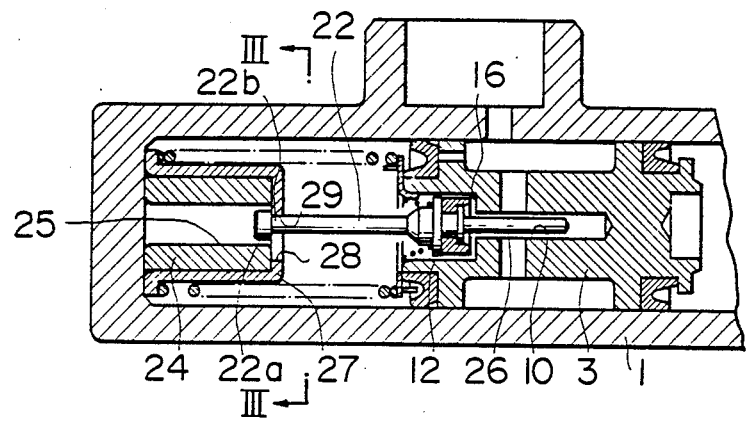
FIG. 4 is a fragmentary view showing, in cross-section and in front part, another type of conventional master cylinder construction.
Figure 5:
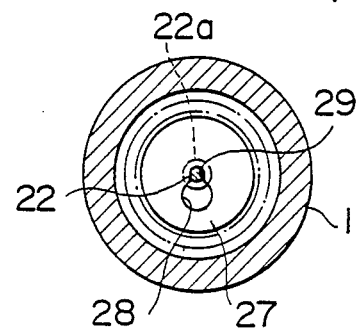
FIG. 5 is a transversal cross-sectional view taken along the plane III—III in FIG. 4.

In the second piston 33, there are seen defined a passage 40 extending axially thereof and a passage 41 extending diametrally, respectively, by way of which passages 40, 41 there is provided an operative intercommunication between the oil inlet 36 and the oil outlet 38. In the frontal or left end of the second piston 33 as viewed in FIG. 1, there is defined a recess 42 which is in communication with the passage 40, in which recess there is seen mounted a valve element 43. This valve element 43 has a forward extension rod 44 and a rearward extension rod 45, both extending forwardly and rearwardly along the axis of the valve element, respectively. A leading end portion or stopping head 44a of the forward extension rod 44 is introduced into a central engaging hole 47 in a spring retainer 46 in such a manner that the stopping head 44a of the rod 44 may be held stopped from moving any further by stopping engagement with the engaging hole 47, when the second piston 33 is caused to return towards its original position. On the other hand, the rearward extension rod 45 of the valve element 43 is inserted slidably into the passage 40 as shown in FIG. 2(a). The rearward extension rod 45 has a first stopping or restricting head 48 having a greater diameter at its free end, which first stopping head 48 extends freely into the inside of the passage 40. In addition, the extension rod 45 has a tapered root portion in the form of coning, the coning having an increased diameter towards the left as viewed in FIG. 2(a). The extension rod 45 root portion comprises a second stopper or restricting portion 49. This second restricting portion 49 is adapted, when urged against a valve seat 51 defined on the bottom of the recess 42 as seen in FIG. 2(b), to seat upon the inner circumference of the passage 40 with a certain gap therewith.

There are seen a spring receiving element 52 fitted around the opening edge of the recess 42, and also a return coil spring 53 disposed operatively between the spring receiving element 52 and a spring retainer 46. Also, in the recess 42, there is disposed a compression spring 54 intermediately between the spring receiving element 52 and the valve element 43, by which spring 54 the valve element 43 is normally biased to its closing direction. With this arrangement, when the second piston 33 is caused to be shifted on its forward stroke, the valve element 43 is now shifted to its closing position under the resilient force of the compression spring 54, and when the second piston 33 is shifted on its return stroke, the leading end or stop head 44a of the forward extension rod 44 is held stopping at the engaging hole 47 of the spring retainer 46, upon which stopping at the engaging hole 47 the valve element 43 is caused to be opened.

With this arrangement of the valve element 43 of the brake master cylinder piston, and when the brake pedal is stepped down upon to make the input rod 34 shifted in a direction shown by an arrow "a" in FIG. 1, the first piston 32 and the second piston 33 are caused to be shifted on their forward strokes, respectively, then to cause operating oil in the master cylinder discharged out of the oil outlets 37, 38. At this moment, a seal ring 50 on the valve element 43 of the second piston 33 is now urged onto the valve seat 51 under the urging force of the compression spring 54 as shown in FIG. 2(b). In this closing position of the valve element 43, the second restricting portion 49 is caused to engage with the inner circumferential edge of the passage 40, thus preventing the valve element 43 from its possible motion in an eccentric attitude while shifting. As the first stop or restricting head 48 is normally extending into the inside of the passage 40, this may serve to prevent a possible inclination of the valve element 43 together with the centering effect on the part of the second restricting portion 49. Under this cooperative function to provide a two-point mount, the axis of the valve element 43 may constantly be held in coincidence with that of the passage 40, when the valve element 43 is in its closing position, and thus serving to prevent the seal ring 50 from approaching the opening of the passage 40, accordingly.

Referring next to a temporary returning motion of the second piston 33 to open the valve element 43 as shown in FIG. 2(a) as encountered in a pumping brake operation, there occurs a flow of oil returning to the oil reservoir. With this return flow of oil, the valve element 43 may possibly be caused to incline out of its normal axial alignment for a while. In this position, however, the axis of the valve element 43 may well turn to its normal position under the effect of forward stroke motion on the part of the second piston 33, as stated hereinbefore, thus eliminating all the possibilities of encroachment of the seal ring as experienced in the conventional master cylinder construction.

Reference having been made to a specific preferred embodiment of the invention, it is to be understood that the present invention is not restricted in the details of arrangement, but rather that the invention may be reduced to practice in various other ways. For instance, while it is stated in the foregoing description that the rearward extension rod 45 is defined with a tapered surface at the root thereof, it is of course feasible in practice that a tapered surface may be defined in the inner circumferential edge of the passage 40, with the root portion of the rod 45 being formed with an enlarged portion or in a flange section.

With such an advantageous arrangement as stated above that the valve element is formed with the reward extension rod having the first and second restricting portions provided both at its leading end and root portions, with the first stopping or restricting head extending into the central oil passage of the master cylinder piston in such a manner that the axis of the valve element may constantly be held in coincidence with that of the passage, when the valve element is in its closing position, there is attained such an advantageous effect to prevent the valve element from taking an inclined or eccentric position to leave its seal ring in access to the opening of the passage, when the valve element is closed, which may provide a relatively large gap therebetween. With this effect, even when an operator may use a so-called pumping brake operation in which there may occur a relatively quick return flow of oil on the piston returning stroke, and immediately after this, the piston may shift on its forward stroke to close the valve, there is no possibility of seal encroachment with the opening of the passage in the master cylinder, at all. As there is no need for additional parts to prevent a possible inclination or eccentric posture of the valve element, it is obviously advantageous in the light of a substantial reduction in number of parts and in number of man-hour involved in the manufacture of a master cylinder assembly, which would naturally contribute to a curtailment in weight of a product as well as to a reduction in production cost, after all.

Figure 6:
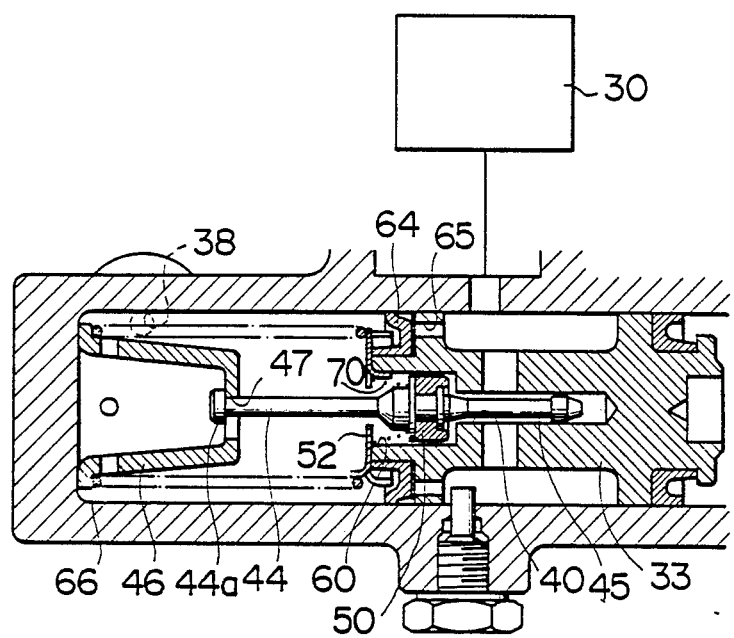
FIG. 6 is an enlarged longitudinal cross-sectional view showing the front end of a master cylinder according to the invention.

Now referring to FIG. 6, there is shown an improved arrangement wherein there is shown provided the second piston 33 which is equipped with the spring receiving element 52 and its relating structure according to the present invention. As shown in this Figure, there is defined the passage 40 extending centrally along the axis of the second piston 33, which passage serves normally to have the oil reservoir 30 in communication with the oil outlet 38. Incidentally, the oil outlet 38 is connected operatively with each of wheel brake cylinders of a vehicle.

It is also seen that the passage 40 is in communication with a recess 60 defined in the front wall portion of the second piston 33. There is a valve element 50 mounted operatively in this recess 60 in such a manner that the passage 40 may be opened or closed by way of the valve element 50, according to the forward or return motion of the second piston 33, respectively. Also, it is seen that the valve element 50 is formed with extension rods consisting of a forward extension 44 and a rearward extension 45, which extend along the axis of the valve element 50, respectively. The leading end or stopping head 44a of the forward extension rod 44 is introduced into the engaging hole 47 defined in the spring retainer 46 in such a manner that the stopping head 44a may be held stopped by engagement with the engaging hole 47, when the second piston 33 is on its return stroke, thus causing the valve element 50 to be opened. The rearward extension rod 45 is guided slidably into the opening of the passage 40 defined in the second piston 33, serving to guide the valve element 50 in a smooth manner.

As shown in FIG. 6, there is mounted the spring receiving element 52 immediately upon the front wall portion of the second piston 33. This spring receiving element 52 is, as typically shown in FIGS. 7 through 9, made of sheet metal stamped out to be a disc shape, with a plurality of outer circumferential edges bent rearwardly to form a series of first bent lugs 61 and with a plurality of outer circumferential edges bent forwardly to form a series of second bent lugs 62, the former being placed in an alternate fashion with every other of the latter, and with the remaining circumferential portions extending as a first spring receiving portion 63. The first series of bent lugs 61 extends, as shown in FIG. 6, in front of a cup seal ring 64 disposed in the outer circumference of the front end of the second piston 33. When the operator uses a pumping brake operation, and so the cup seal ring 64 may turn to be deformed forwardly under the effect of a flow of oil jetted out of a plurality of small openings 65 defined in the second piston 33, it is prevented from being deformed with the aid of the first series of bent lugs 61. The spring receiving portion 63 serves to receive one end of a return spring 66, which is adapted to bias the second piston 33 towards its return stroke. The second series of bent lugs 62 serve to locate the end of the return spring 66 in working position.

Figure 7:
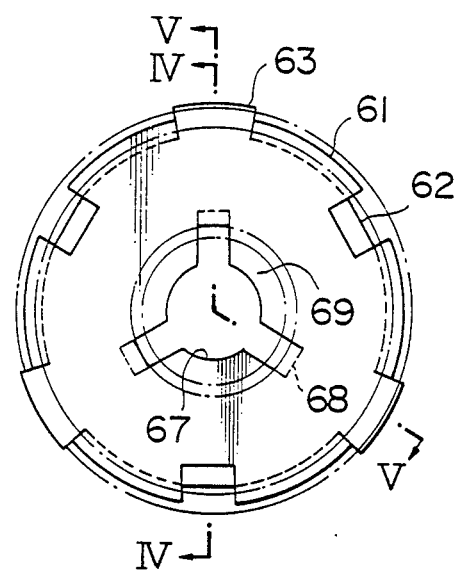
FIG. 7 is a front elevational view showing a spring retainer.
Figure 8:
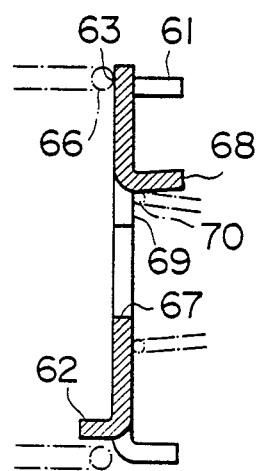
FIG. 8 is a transversal cross-sectional view taken along the plane IV—IV in FIG. 7.
Figure 9:
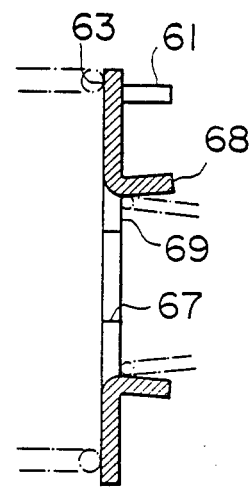
FIG. 9 is a similar cross-sectional view taken along the plane V—V in FIG. 7.

On the other hand, there is seen defined a central through hole 67 in the center of the spring receiving element 52, through which the forward extension rod 44 of the valve element 50 may extend. As shown in FIGS. 7 through 9, the inner circumferential edge of the central through hole 67 is slitted at positions of an even number, for instance, at six points in the shown embodiment, to be a third plurality of segments or lugs 68 which are bent rearwardly as viewed in FIGS. 8 and 9, the remaining circumferential portions forming a second spring receiving element 69. The plurality of third lugs 68 have their tip ends extending slightly radially outwardly as shown in the Figures in such a manner that when the spring receiving element 52 is inserted into the inner circumferential wall of the recess 60 defined in the second piston 33 as seen in FIG. 6, the plurality of third bent lugs 68 may urge resiliently and fit snugly upon the inner wall surface of the recess 60 to positively keep the spring receiving element 52 in position in the second piston 33. The second spring receiving element 69 serves to receive one end of the compression spring 70, which is adapted to bias the valve element 50 towards its closing position. The third bent lugs 68 may also afford positioning one end of the compression spring 70, as shown in FIG. 8. With such a unique construction of the spring receiving element 52 for use in a vehicle's brake master cylinder, this spring receiving element may, in addition to its proper function as served with the conventional construction, afford assistance to suppress possible deformation of the cup seal ring 64 on the occasion of a pumping brake operation. More specifically, when the operator of a vehicle may use a pumping brake operation, wherein the second piston 33 may be shifted on its return stroke or towards right as viewed in FIG. 6, oil existing in the cylinder may flow through the small openings 65 in the piston 33 towards left as viewed in FIG. 6, which may possibly cause the cup seal ring 64 to be deformed towards the left. In this condition, however, with the extension of the first bent lugs 61 of the spring receiving element 52 disposed in back-up relationship on the bottom of the cup seal ring 64, an extent of deformation of the seal ring may be held to a minimum, thereby to prevent a possibility of damage of the seal ring from encroachment by the oil passage, accordingly.

While the invention is described herein by way of a specific embodiment thereof, it is to be understood that the invention may be put into reduction in various other ways without being restricted to this specific embodiment thereof, but many other alterations and modifications may be made without departing from the spirit and scope of the invention. For instance, the number and shape of a plurality of bent lugs 61, 62, 68 may be changed as the case may be.

According to such an advantageous design and construction of the spring receiving element 52, which is formed from a sheet metal and is equipped with the plurality of third bent lugs serving to snugly fit into the recess defined for receiving the valve of a master cylinder piston, there is attainable such an advantageous effect that no additional special parts are required for mounting a spring retaining element, and this advantage provides for efficient installation work of the spring receiving element as well as a substantial reduction in number of parts required. In addition, since the spring receiving element may be formed from a sheet metal, it is easy to manufacture the same and it may be manufactured at a relatively low cost. Besides, it may be made to a small thickness, which means contributes to a substantial reduction in space in the axial direction required for installation. Among such advantages, a greatest effect attained from the present invention is the fact that with a due extension of the plurality of first bent lugs disposed in back-up relationship on the bottom of the cup seal ring of a master cylinder piston, it is feasible in practice to prevent the cup seal ring from being deformed by the effect of oil stream as may occur on the return stroke of the piston, thereby making it possible to prevent a possibility that the seal ring may be damaged from encroachment by the oil passage in the piston as encountered during a pumping brake operation.

It is also to be understood that the appended claims are intended to cover all of such generic and specific features particular to the invention as disclosed herein and all statements relating to the scope of the invention, which as a matter of language might be said to fall thereunder.

What is claimed is:

1. A brake master cylinder arrangement, comprising:
a cylinder;
a piston positioned in said cylinder, said piston having a front wall surface and a cup seal ring adjacent the front wall surface;
a spring receiving element made of sheet metal including first lugs formed at a plurality of positions about the outer circumference of said spring receiving element and extending forwardly of said cup seal ring and second lugs formed at a plurality of positions about the outer circumference of said spring receiving element and extending forwardly of said piston, the remaining portion of the outer circumference of said spring receiving element excluding said first and second lugs being adapted to serve as a first spring receiving portion to receive one end of a return spring and maintain said one end of said return spring in position by engagement with said second lugs at the outer circumference of said spring receiving element and third lugs formed at a plurality of positions of a central portion of said metal sheet, said third lugs extending into recesses formed in said piston so as to engage the inner wall surface of said recesses, the central part of said metal sheet excluding said third lugs being adapted to serve as a second spring receiving portion and said second spring receiving portion being adapted to receive one end of a compression spring.

* * * * *